(12) United States Patent
Seippel

(10) Patent No.: US 8,728,415 B2
(45) Date of Patent: *May 20, 2014

(54) MICROTITRATION PLATE

(75) Inventor: Martin Seippel, Ammersbek (DE)

(73) Assignee: Eppendorf AG, Hamburg (DE)

( * ) Notice: Subject to any disclaimer, the term of this patent is extended or adjusted under 35 U.S.C. 154(b) by 76 days.

This patent is subject to a terminal disclaimer.

(21) Appl. No.: 13/114,503

(22) Filed: May 24, 2011

(65) Prior Publication Data

US 2012/0129250 A1    May 24, 2012

Related U.S. Application Data

(63) Continuation of application No. 10/393,911, filed on Mar. 21, 2003.

(30) Foreign Application Priority Data

Mar. 23, 2002 (DE) .................................. 102 12 761

(51) Int. Cl.
*B01L 3/00* (2006.01)
(52) U.S. Cl.
USPC .......................................................... 422/553
(58) Field of Classification Search
USPC .......................................................... 422/553
See application file for complete search history.

(56) References Cited

U.S. PATENT DOCUMENTS

| | | |
|---|---|---|
| 4,725,388 A | 2/1988 | Nelson et al. |
| 5,508,197 A | 4/1996 | Hansen et al. |
| 5,545,528 A | 8/1996 | Mitsuhashi et al. |
| 5,721,136 A | 2/1998 | Finney et al. |
| 5,759,494 A | 6/1998 | Szlosek |
| 5,759,774 A | 6/1998 | Hackett et al. |
| 6,232,114 B1 | 5/2001 | Coassin et al. |
| 6,340,589 B1 | 1/2002 | Turner et al. |
| 2001/0051112 A1 | 12/2001 | Gulzow et al. |
| 2003/0039592 A1 | 2/2003 | Knebel |

FOREIGN PATENT DOCUMENTS

| | | |
|---|---|---|
| EP | 0106662 A2 | 4/1984 |
| EP | 0844025 A2 | 5/1998 |
| EP | 1161994 A2 | 12/2001 |

OTHER PUBLICATIONS

European Patent Office Search Report, EP 10011995.7, dated Mar. 14, 2011, pp. 1-4.
Decision from the German Federal Patent Court announced on Feb. 16, 2009 concerning German patent application 10212761, and translation thereof; 18 pages.
Decision from the Technical Board of Appeals of the European Patent Office concerning European patent application 03005574.3 dated Jul. 13, 2011, and translation thereof; 18 pages.

*Primary Examiner* — Paul Hyun
(74) *Attorney, Agent, or Firm* — Abelman, Frayne & Schwab

(57) ABSTRACT

A microtitration plate for use for automated polymerase chain reaction (PCR) is provided. The microtitration plate includes a frame which has a plate with a multiplicity of holes molded of a polypropylene or a polycarbonate. The microtitration plate further includes a multiplicity of receptacles made of the same polypropylene or polycarbonate. The receptacles are fixedly connected to the plate at the holes by fusing the same polypropylene or polycarbonate thereby directly molding the receptacles to the plate Each receptacle has a receiving portion protruding from the underside of the plate, and is accessible from the upper surface of the plate through apertures.

10 Claims, 3 Drawing Sheets

MICROTITRATION PLATE

RELATED APPLICATIONS

This application is a continuation of pending U.S. application Ser. No. 10/393,911 filed Mar. 21, 2003, which is incorporated by reference herein.

BACKGROUND OF THE INVENTION

1. Field of the Invention

The invention relates to a microtitration plate.

2. Description of the Prior Art

Microtitration plates are used for most varied microbiological, cell-breeding, and immunological techniques. In particular, microtitration plates are employed for the PCR or the breeding of microorganisms or cells.

Microtitration plates have already been known which have a frame with a plate to which a multiplicity of receptacles are fixed which have a receiving portion protruding from the underside of the plate and are accessible from the upper surface of the plate through apertures. The receptacles are also referred to as "wells". The current 96-receptacle microtitration plates have 8×12=96 receptacles in rows and columns. However, microtitration plates having a larger number of receptacles are used more and more.

Single-component microtitration plates in polystyrene are unsuitable for the PCR, particularly because the softening temperature of this plastic (about 85° C.) is exceeded during the PCR.

Conventional single-component microtitration plates in polypropylene are generally adapted to be used for the PCR. However, they are flexurally soft, tend to be distorted, are uneven and can be manufactured only at large tolerances and undergo large tolerance variations when in use. Specifically, they are not particularly suited for being handled by automatic devices because their softness makes it difficult for automatic devices to grip them. Further, their low dimensional stability may have the consequence that the proportioning needles will contact the walls while being introduced into the receptacles. Furthermore, heat transfer into the walls is poor because the thick walls of the receptacles resist to it, which is adverse to temperature regulation and the length of cycle times during the PCR.

EP 1 161 994 A2 discloses a microtitration plate with a frame made of a stiff first plastic which has a plate with a multiplicity of holes, and a multiplicity of receptacles made of a second plastic suited for the PCR and/or exhibiting permeability to oxygen, which are fixedly connected to the plate by directly molding them thereto, have a receiving portion protruding from the underside of the plate and are accessible from the upper surface of the plate through apertures. The first plastic may be chosen so as to impart to the frame the desired stiffness for being handled by an automatic device. This document further discloses a manufacturing process in which the frames and receptacles of the microtitration plate are produced in a multicomponent molding procedure.

Therefore, it is the object of the invention to provide another microtitration plate having more favorable characteristics in use.

In addition, a technique for the manufacture of the microtitration plate is intended to be provided.

SUMMARY OF THE INVENTION

The object of the invention is achieved by a microtitration plate having a frame made of a plastic which has a plate with a multiplicity of holes, and a multiplicity of receptacles made of the same second plastic which are fixedly connected to the plate by directly injection molding them to each other at the holes, have a receiving portion protruding from the underside of the plate, and are accessible from the upper surface of the plate through apertures.

Hence, the inventive microtitration plate is made of a single plastic only. Unlike conventional single-component microtitration plates which are completely molding in a single injection molding process, the inventive microtitration plate has the frame and receptacles molded to each other in two injection processes. This makes it possible to meet the requirements made to the frame and receptacles by giving the frame and receptacles a particular configuration and employing molding processes specifically adapted thereto while using a single plastic only. Injection molding to each other allows to achieve short flow paths of the plastic material in the frame and in the receptacles, which helps to achieve an increased injection pressure and to mold the contours of the frame and receptacle more easily. Thus, the receptacles can be molded to have particularly thin walls, specifically for high heat conductivity in view of their use in the PCR. Further, the relatively thick-walled design of the frame which can even be stiffened by ribs and other structures may make the microtitration plate suitable for being handled by an automatic device. In addition, the microtitration plate has the advantage that the receptacles may be injection molded only after the plate is molded and undergoes shrinkage, which allows to achieve microtitration plates which are particularly stable dimensionally. Moreover, the plastics of the frame and receptacles can be fused to each other at the injection molding points (points of injection) in the area of the holes so that the frame and receptacles are connected in a material fit and, thus, are connected to each other particularly firmly. This can also be accomplished by melting on the plastic which has been molded first and has solidified already, by means of the heat of the plastic which is molded later, which causes it to be fused to the second plastic.

Generally, the connection of the receptacles to the frame can be made by a material fit and/or a formlocking and/or forcelocking fit. It preferably is made in a forcelocking fit by molding the receptacles to holes having varying cross-sections in an axial direction and/or to the external area of the holes on at least one side of the plate while connecting them thereto in a formlocking fit. A formlocking fit, for instance, may be achieved by utilizing a different shrinkage behavior of the frame and receptacles.

As mentioned previously, molded the receptacles to each other in a direct way makes possible very short flow paths of the material in molding, which allows to achieve particularly small wall thicknesses of the receptacles. These are preferably in the range of about 0.05 to 0.25 mm and, in particular, may be about 0.1 mm. This favors heat transfer. For this purpose, the receptacle bottom of each receptacle has provided thereon a molding point from which the material fills a first wall portion of a reduced wall thickness and an upper wall portion connected to the plate. It is preferred that the upper wall portion be designed as a collar of an increased wall thickness, which allows to manufacture the microtitration plate at particularly low tolerances.

Hence, since the frame and the receptacles are molded in two steps the best solutions possible will be achieved with materials which do not necessarily correspond optimally to the desired functions of the frame and receptacles. Higher rigidity, better planarity, a lower tendency to distortion, and smaller tolerances are ensured by the configuration of the frame and a molding procedure adapted thereto. It is preferred that the frame of the microtitration plate be provided with a bordering protruding from the underside which enhances stability, may form a surface to stand on, and offers a surface to be clasped by the automatic device. It is advantageous for the frame to have several edge-sided molding points (about four to six). The extremely thin walls for better heat transfer are achieved by moulding the receptacles separately. No frame is filled via the receptacles so that the full pressure gradient is available only for one receptacle each.

The plastic, in particular, may be a material which is suited for the PCR because of its increased resistance to temperature and reduced affinity or neutrality to the DNA or other substances. A microtitration plate made of polypropylene is particularly beneficial for the PCR. It is preferred that it is pure polypropylene which, in particular, is free from protein-containing additives or fillers. However, to increase its strength, the polypropylene may generally contain other fillers which do not contain protein. Thus, for instance, it appears possible to employ high-purity fiber glass as a filler.

According to another aspect, the plastic is a polycarbonate. The polycarbonate used for the PCR is preferably a particularly temperature-resistant and/or chemical-resistant polycarbonate.

Finally, according to an aspect, the plastics of the frame and receptacles are of different colors. A differentiation is possible here, in particular, by coloring the plastics black and white for the frame and receptacles, respectively. For instance, this makes it easier to optically check the position of the microtitration plates and receptacles.

According to the inventive manufacturing technique, the frame and receptacles are produced in a multi-component molding technique. In the simplest case, it is a two-component injection molding technique or "twin-shot" technique.

Generally, the sequence of molding the frame and receptacles is random. For manufacture at particularly low tolerances, it is preferred to mold the frame initially and the receptacles subsequently. This has the advantage that the frame first may undergo a certain shrinkage or reduction in volume before the receptacles are molded thereto. This is beneficial, in particular, for crystalline or partially crystalline plastics such as polypropylene which undergo heavy shrinkage following the injection molding process. The time interval from molding the frame to molding the receptacles thereto may be chosen so that the shrinkage of the frame (by cooling it down) essentially is effected completely. Once the receptacles are molded on shrinking techniques virtually do not impair the dimensional stability of the microtitration plate any longer. It specifically is the local tolerance of the receptacles which, thus, can be confined to very low values (about±0.15 mm around their theoretical positions). This makes it easier to introduce proportioning needles with no wall contact.

It is particularly advantageous here if the upper wall region of the receptacles is designed as a collar of an increased wall thickness because the collar may compensate for hole position tolerances that have remained during molding.

According to an aspect, the frame having undergone molding is initially malleablized, after which the receptacles are molded to the frame. Malleablizing the frame can cause the crystalline structure of the frame to disappear completely. This can be accomplished, for instance, by malleablizing it at a temperature of up to about 120° C. over a period of about one hour, as a maximum. It is particularly a frame in polypropylene which can completely shrink under the conditions mentioned.

According to an aspect, the plastics of the frame and receptacles are of different colors.

This microtitration plate is preferably manufactured again by a multi-shot molding technique, particularly a two-shot technique ("twin-shot" technique).

BRIEF DESCRIPTION OF THE DRAWINGS

The invention will now be explained in more detail with reference to the accompanying drawings of different embodiments. In the drawings.

DETAILED DESCRIPTION OF THE PREFERRED EMBODIMENTS

Figure 1:
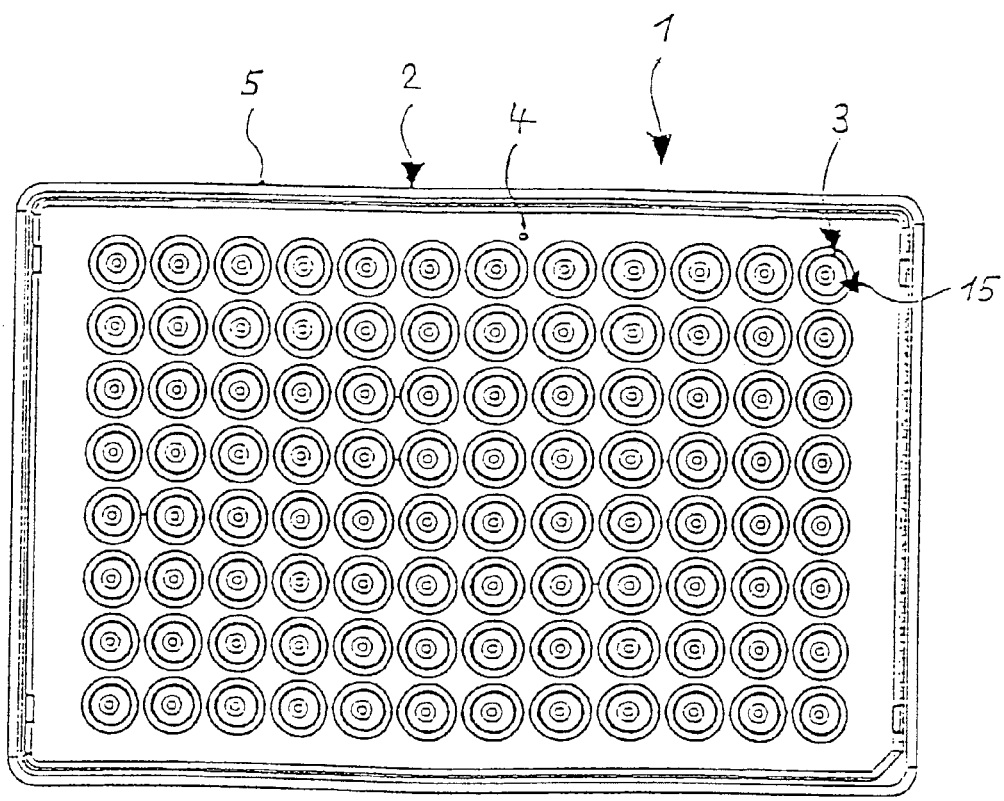
FIG. 1 shows a 96 type microtitration plate with a frame and receptacles made of various plastics in a plan view.
Figure 2:
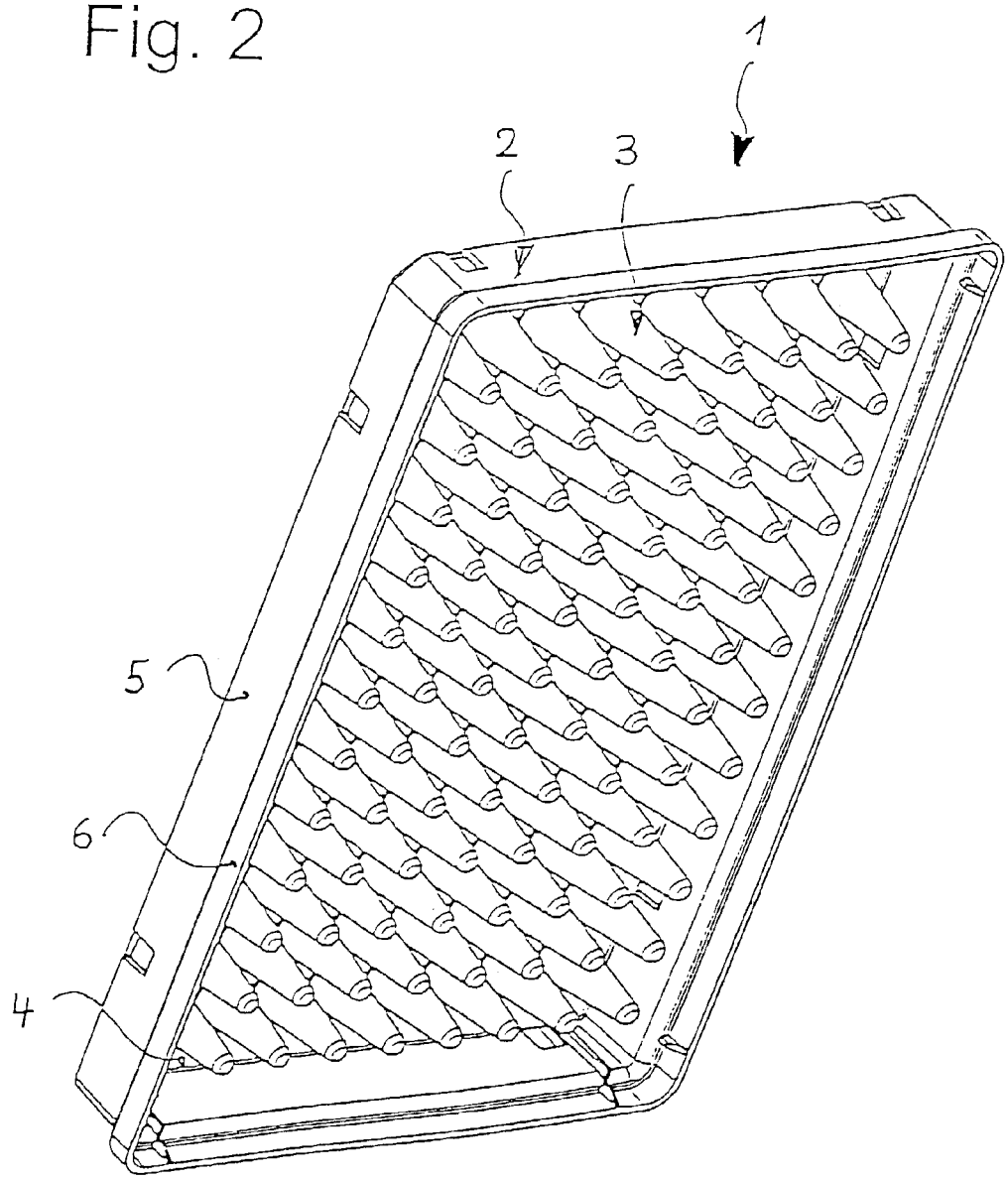
FIG. 2 shows the same microtitration plate in an oblique perspective view from bottom.
Figure 3:
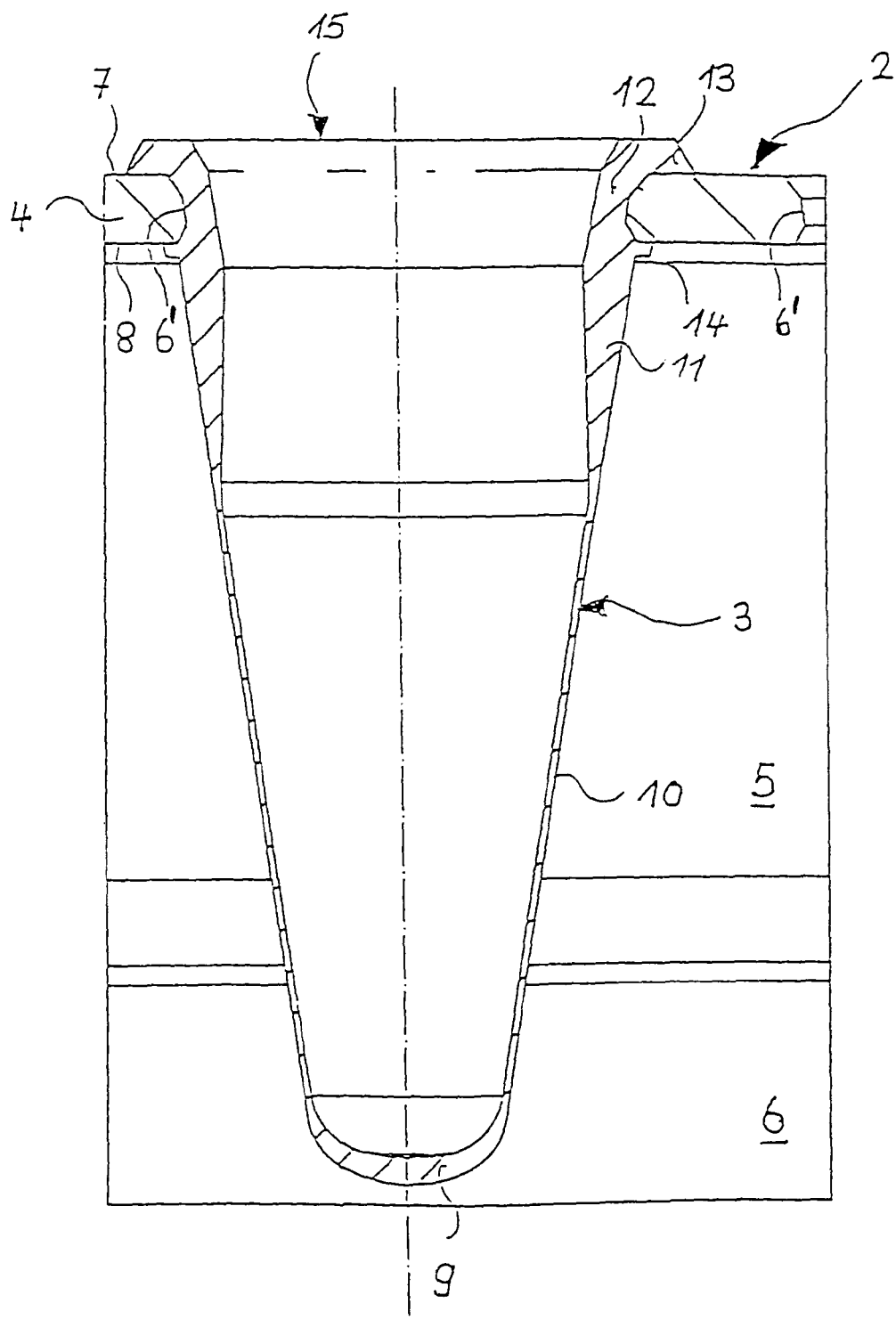
FIG. 3 shows the same microtitration plate in a largely magnified vertical section-in-part through the plate of the frame and a receptacle.

Referring to FIGS. 1 through 3, a microtitration plate 1 comprises a frame 2 and a multiplicity of receptacles 3. There is a total of 96 receptacles 3 in 8 columns and 12 rows.

The frame 2 has a substantially rectangular plate 4 the outer edge of which is surrounded by a bordering 5 which protrudes approximately perpendicularly from the underside of the rectangular plate 4, i.e. beyond the receptacles 3. At bottom, the bordering 5 as is known has an expansion 6, which enables stacking on the upper surface of an appropriate microtitration plate 1.

The frame 2 has a total of 96 holes 6 in the rectangular plate 4. These have a course of cross-section which widens towards the upper surface 7 of the rectangular plate 4 in two portions of different conicity and towards the underside 8 of the rectangular plate 4 in a conical portion.

In a first molding step, the frame 2 is integrally molded from a plastic. It is preferred to use a high-purity polypropylene, possibly with a protein-free filter which, when cured, imparts a certain stiffness to the frame 2. The molded points are at the edge of frame 2, e.g. at the lower edge of the bordering 5.

At their base, receptacles 3 have a cup-shaped bottom 9 which is bordered by a conical wall portion 10 of a very small wall thickness (abt. 0.1 mm) Above it, there is a wall portion 11 the wall thickness of which gradually increases towards the top. At its outside, it has the same conicity as has the wall portion 10. At its inside, however, it is designed nearly cylindrically, which results in an approximately wedge-shaped course of cross-section.

Wall portion 11 terminates in a collar 12 which also is of a largely increased wall thickness with respect to wall portion 10. Receptacles 3 are molded to rectangular plate 4 in the area of collar 12. To this end, collar 12 externally bears against the inner periphery of holes 6'. It further has a projection 13, 14 each at the upper surface 7 and the underside 8 of rectangular plate 4, which makes a safe connection to rectangular plate 4.

In the area of collar 12, receptacles 3 have a cross-section expanding towards the top in two portions of different conicity. The receptacles are accessible from the upper surface of plate rectangular 4 through apertures 15.

All of the receptacles are simultaneously molded directly to the frame 2 and the holes 6' thereof. Each receptacle 3 has a central molding point of its own at the underside of bottom 9. This helps achieve shorter molding paths which are made possible by the particularly small wall thickness in wall portion 10. There is a specific suitability of the receptacles for use in the PCR if polypropylene is used is as a plastic material.

The required stiffness of the frame 2 for being handled by an automatic device can be ensured by giving it appropriate dimensions and bracing it accordingly or incorporating appropriate fillers.

What is claimed is:

1. A microtitration plate for use for automated polymerase chain reaction (PCR), comprising:
   a frame (2) which has a plate (4) wherein the plate (4) has a multiplicity of holes (6') molded of a polypropylene; and
   a multiplicity of thin-wall receptacles (3) having a wall thickness of from about 0.05 to about 0.25 mm at least in one wall portion, and made of identical same type of polypropylene as the frame (2) and the plate (4), with the receptacles (3) fixedly connected to the plate (4) at the holes (6') by fusing to each other the identical type of polypropylene of the receptacles (3) and the plate (4) due to direct molding of the receptacles (3) to the plate (4), the receptacles (3) having receiving portions (9, 10, 11) protruding from the underside (8) of the plate (4), and are accessible from the upper surface (7) of the plate (4) through apertures (15), wherein the frame (2) and the receptacles (3) are composed of the identical type of polypropylene.

2. The microtitration plate according to claim 1, wherein the receptacles (3) have a wall portion (10) of a very small wall thickness adjacent to a receptacle bottom (9) and have an upper wall portion (12) connected to the plate (4).

3. The microtitration plate according to claim 1, wherein the receptacles (3) have a collar of an increased wall thickness as an upper wall portion (12) connected to the plate (4).

4. The microtitration plate according to claim 1, wherein each receptacle (3) has a substantially cup-shaped bottom (9), a wall portions (10) of a small wall thickness that is substantially conical, and a wall portion (11) of a wall thickness which gradually increases upwardly adjoining the wall portion (10) of a small wall thickness and an upper wall portion (12) connected to the plate (4) and extending to an opposing side of the plate (4).

5. The microtitration plate according to claim 1, wherein the receptacles (3) have molding points at the bottom (9) of the receptacles.

6. The microtitration plate according to claim 1, wherein the frame (2) has a bordering (5) protruding from the underside (8) thereof at the edge of the plate (4).

7. The microtitration plate according to claim 1, wherein the frame (2) has several edge-sided molding points.

8. The microtitration plate according to claim 1, which is made of a plastic including a filler which does not contain protein.

9. The microtitration plate according to claim 1, which is made of a plastic filled with fiberglass.

10. A microtitration plate for use for automated polymerase chain reaction (PCR), comprising:
   a frame (2) which has a plate (4) wherein the plate (4) has a multiplicity of holes (6') molded of a polycarbonate
   a multiplicity of thin-wall receptacles (3) having a wall thickness of from about 0.05 to about 0.25 mm at least in one wall portion, and molded of a polycarbonate, with the receptacles (3) fixedly connected to the plate (4) at the holes (6') by fusing to each other both the polycarbonate of the plate (4) and the polycarbonate of the receptacles (3) due to direct molding of the receptacles (3) to the plate (4), the receptacles (3) having receiving portions (9, 10, 11) protruding from the underside (8) of the plate (4), and are accessible from the upper surface (7) of the plate (4) through apertures (15), wherein the frame (2) and the receptacles (3) are composed of polycarbonates.

\* \* \* \* \*